(12) United States Patent
Selvaraj

(10) Patent No.: US 8,411,299 B2
(45) Date of Patent: Apr. 2, 2013

(54) APPROACH FOR MANAGING PRINT ERRORS USING A PRINT AGENT

(75) Inventor: Senthil K. Selvaraj, Snoqualmie, WA (US)

(73) Assignee: Ricoh Company, Ltd., Tokyo (JP)

( * ) Notice: Subject to any disclaimer, the term of this patent is extended or adjusted under 35 U.S.C. 154(b) by 1530 days.

(21) Appl. No.: 11/934,671

(22) Filed: Nov. 2, 2007

(65) Prior Publication Data
US 2009/0116053 A1 May 7, 2009

(51) Int. Cl.
*G06F 15/00* (2006.01)
(52) U.S. Cl. ....... 358/1.15; 358/1.1; 358/1.14; 358/1.13
(58) Field of Classification Search .............. 358/1.15, 358/1.1, 1.14, 1.13
See application file for complete search history.

(56) References Cited

U.S. PATENT DOCUMENTS

| | | | |
|---|---|---|---|
| 6,452,692 B1 * | 9/2002 | Yacoub | 358/1.15 |
| 2003/0011805 A1 * | 1/2003 | Yacoub | 358/1.15 |
| 2003/0030846 A1 * | 2/2003 | Mori et al. | 358/400 |

FOREIGN PATENT DOCUMENTS

| | | | |
|---|---|---|---|
| JP | 2002149362 A | 5/2002 | |
| JP | 2005122275 A | 5/2005 | |

* cited by examiner

*Primary Examiner* — King Poon
*Assistant Examiner* — Iriana Cruz
(74) *Attorney, Agent, or Firm* — Hickman Palermo Truong Becker Bingham Wong LLP; Edward A. Becker

(57) ABSTRACT

An approach for managing print errors using a print agent includes a spooler process initiating a print agent in response to receiving error data that indicates that a printing device cannot currently process print data. The print agent provides printing device discovery services that determine other printing devices that are available to process the print data and allow a user to redirect the print data to another printing device. The print agent may also provide error logging functionality that allows the creation of an error log. The error log contains information about the errors that prevented the printing device from processing the print data. The error log aids users and/or administrative personnel in diagnosing and/or addressing the errors. The use of a print agent in this manner provides users with more information about printing errors and also allows users to select an alternative printing device to process print data.

12 Claims, 5 Drawing Sheets

APPROACH FOR MANAGING PRINT ERRORS USING A PRINT AGENT

FIELD OF THE INVENTION

This invention relates generally to printing and more particularly, to an approach for managing print errors using a print agent.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Generally speaking, print drivers are processes that process print data generated by an application program and convert the print data into a format supported by a printing device that is intended to process the print data. For example, a user creates an electronic document using a word processing application. The user then selects a print option in the application program to request that the electronic document be printed to a particular printing device. In response to the user selecting the print option, the application program generates and provides print data to a print driver installed on the user's client device. Sometimes this involves the use of an intermediary process referred to as a spooler process that saves the print data locally. The print driver processes the print data and generates translated print data that is in a format supported by the particular printing device. For example, in the situation where the particular printing device supports postscript, the print driver processes the print data and generates translated print data that conforms to the postscript format. The print driver then transmits the translated print data via the spooler process to the particular printing device. The particular printing device processes the translated print data and generates a printed version of the electronic document.

Conventional print drivers are printing device specific. That is, each print driver is designed to translate print data into a format that conforms to a particular format supported by a particular printing device. Print drivers are usually provided on storage media when a printing device is purchased and may also be downloaded over the Internet. A print driver needs to be installed for any printer that the user intends to use. For example, a user might install on their laptop computer both a print driver for their home printer as well as a print driver for a work printer. Some users install several print drivers for different printers at work, especially users who travel to different locations of a business organization and use printers at each location.

One of the problems with conventional printing approaches is that users do not necessarily know the status of printers that they are not currently using. For example, when traveling to a different location, users do not know the status of printers at the next location. Printers may be unavailable or have an error that prevents them from printing, and users will likely not know that before attempting to print. The result of printing to a printer that is not available or that has an error condition that prevents printing is conventionally a simple error message indicating that the print job failed with little other information. In this situation, a user is often left to inquire as to the status of the printing device, for example, whether the printing device is actually available and if so, how to correct the error. If a user decides to use a different printing device, the user must determine the available printing devices and their capabilities and also must acquire, install and configure the necessary print drivers. These problems can be exacerbated when users are using small portable devices with limited user interfaces because downloading, installing and configuring print drivers can be more difficult with these types of limited devices. Furthermore, users must know how to configure the printing devices once the print drivers are installed. For example, users must generally know the IP address and port of a printing device to configure the print driver. Thus, when users travel to different locations with mobile devices, they often find it difficult to use printing devices at those locations.

SUMMARY

An approach for managing print errors using a print agent includes a spooler process initiating a print agent in response to receiving error data that indicates that a printing device cannot currently process print data. The print agent is separate from an application program that generated the print data and includes functionality that assists users in managing print errors. According to one embodiment of the invention, the print agent provides printing device discovery services that determine other printing devices that are available to process the print data and allow a user to redirect the print data to another printing device. According to another embodiment of the invention, the print agent provides error logging functionality that allows the creation of an error log. The error log contains information about one or more errors that prevented the printing device from processing the print data. The error log aids users and/or administrative personnel in diagnosing and/or addressing the errors. The use of a print agent in this manner provides users with more information about printing errors and also allows users to select an alternative printing device to process print data.

According to one embodiment of the invention, a computer-implemented method is provided for processing print data. According to the method, print data is received from an application program. The print data conforms to a format supported by a printing device. A spooler process sends the print data to the printing device and receives error data that indicates that the printing device is not able to currently process the print data. In response to receiving the error data, the spooler process initiates a print agent that is separate from the application program. The print agent automatically discovers one or more other printing devices that are currently available to process the print data and causes a graphical user interface to be displayed, wherein the graphical user interface includes one or more graphical user interface objects that correspond to the one or more other printing devices. In response to detecting a user selection of a particular user interface object that corresponds to a particular printing device, the print agent sends the print data to the particular printing device for processing.

According to one embodiment of the invention a computer-implemented method is provided for processing print data. According to the method, print data is received from an application program. The print data conforms to a format supported by a printing device. A spooler process send the print data to the printing device and the spooler process receives error data that indicates that the printing device is not able to currently process the print data. In response to receiving the error data, the spooler process initiates a print agent that is separate from the application program. The print agent generates, based upon log configuration data, error log data that indicates one or more attributes of the error data and causes the error log data to be stored on a client device.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
    II. PRINT ERROR MANAGEMENT ARCHITECTURE
    III. MANAGING PRINT ERRORS USING A PRINT AGENT
    IV. IMPLEMENTATION MECHANISMS

I. Overview

An approach for managing print errors using a print agent includes a spooler process initiating a print agent in response to receiving error data that indicates that a printing device cannot currently process print data. The print agent is separate from an application program that generated the print data and includes functionality that assists users in managing print errors. According to one embodiment of the invention, the print agent provides printing device discovery services that determine other printing devices that are available to process the print data and allow a user to redirect the print data to another printing device. According to another embodiment of the invention, the print agent provides error logging functionality that allows the creation of an error log. The error log contains information about one or more errors that prevented the printing device from processing the print data. The error log aids users and/or administrative personnel in diagnosing and/or addressing the errors. The use of a print agent in this manner provides users with more information about printing errors and also allows users to select an alternative printing device to process print data.

II. Print Error Management Architecture

Figure 1:
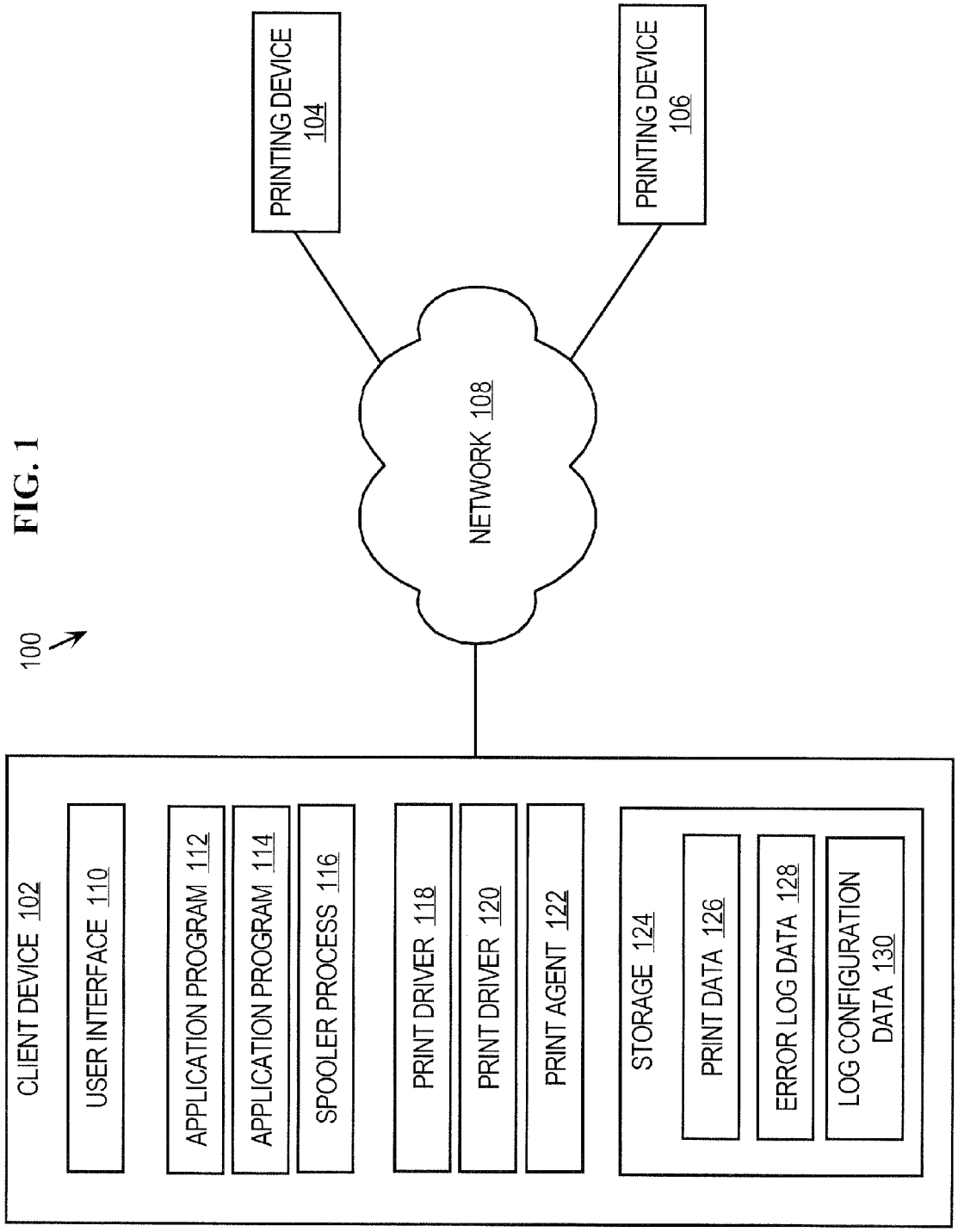
FIG. 1 is a block diagram that depicts an example arrangement in which a print agent may be used to manage print errors, according to an embodiment of the invention.

FIG. 1 is a block diagram that depicts an example arrangement 100 in which a print agent is used to manage print errors, according to an embodiment of the invention. Arrangement 100 includes a client device 102 communicatively coupled to printing devices 104, 106 via a network 108. Network 108 may be implemented by any medium or mechanism that provides for the exchange of data between the various elements depicts in FIG. 1. Examples of network 108 include, without limitation, a network such as a Local Area Network (LAN), Wide Area Network (WAN), Ethernet or the Internet, or one or more terrestrial, satellite or wireless links. Network 108 may also provide secure communications between the various elements depicted in FIG. 1. The various elements depicted in FIG. 1 may also communicate with each other via one or more direct communications links that are not depicted in FIG. 1 or described herein for purposes of brevity.

Client device 102 may be any type of client device and the invention is not limited to any particular type of client device. Examples of client device 102 include, without limitation, a desktop computer, a laptop computer, a personal digital assistant (PDA), a mobile device and a telephony device. In the present example, client device 102 includes a user interface 110, application programs 112, 114, a spooler process 116, print drivers 118, 120, a print agent 122 and storage 124. Storage 124 stores print data 126, error log data 128 and log configuration data 130. Client device 102 may include other mechanisms, modules, processes, etc., depending upon a particular implementation, that are not depicted in FIG. 1 or described herein for purposes of explanation.

Printing devices 104, 106 may be any type of device that is capable of processing print data and generating a printed version of an electronic document reflected in the print data. Examples of printing devices 104, 106 include, without limitation, printers, network-enabled copy machines and multi-function peripherals (MFPs), and the approaches described herein are not limited to any particular type of printing devices 104, 106. Embodiments of the invention are described herein in the context of two printing devices depicted in FIG. 1, but the approach is applicable to any number of printing devices disposed in the same or different physical locations. Client device 102 may provide print data to printing devices 104, 106 in any format and according to any communications protocol, depending upon a particular implementation. For example, SNMP may be used.

User interface 110 may be implemented by any mechanism(s) and/or process(es) that allow for the exchange of information between client device 102 and users. Examples of user interface 110 include, without limitation, a display, such as a cathode ray tube (CRT) or liquid crystal display (LCD), and an input device, such as a keypad, touchpad, touch screen, keyboard or mouse, or any combination of displays and input devices.

Application programs 112, 114 may be any type of applications that are capable of generating print data. Examples of Application programs 112, 114 include, without limitation, a word processing program, a spreadsheet program, an email program or any other type of application.

Figure 3:
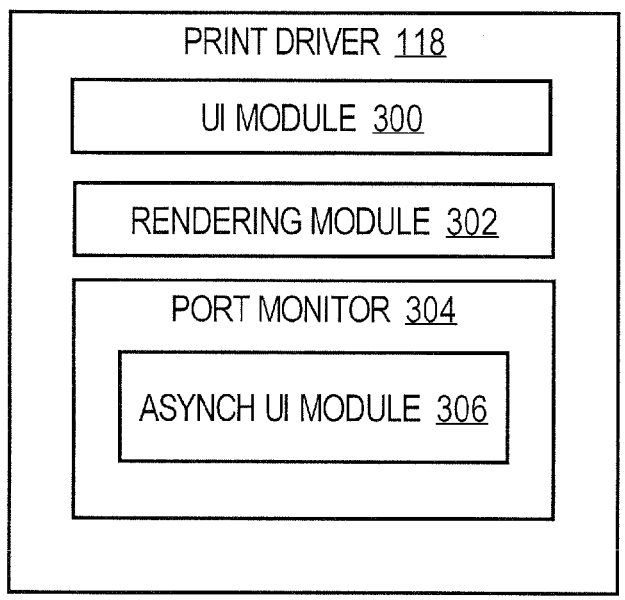
FIG. 3 is a block diagram that depicts an example implementation of a print driver.

Print drivers 118, 120 are print drivers configured to process data from application programs 112, 114 and generate print data that conforms to a format supported by printing device 104, 106, respectively. FIG. 3 is a block diagram that depicts an example implementation of print driver 118. In this example implementation, print driver 118 includes a user interface (UI) module 300, a rendering module 302 and a port monitor 304. Print driver 118 may include other modules, elements and functionality not depicted in FIG. 1 or described herein for purposes of brevity. UI module 300 implements the graphical user interface (GUI) for print driver 118 on user interface 110. Rendering module 302 processes print data and generates translated print data that conforms to a format supported by an intended recipient printing device. For example, rendering module 302 may process print data 126 generated by application program 112, e.g., a word processing program, and generate translated print data that conforms to the postscript format, on the basis that the print data 126 is intended to be processed by printing device 104 and printing device 104 supports postscript. Port monitor 304 may be implemented in many different ways, depending upon a particular implementation. For example, port monitor 304 may include an ASynch UI module for the Vista operating system. UI module 300, port selection UI module 132 and rendering module 302 are described in more detail hereinafter.

Print agent 122 provides for the management of print errors as described herein by providing printing device discovery services and error logging. Print agent 122 may be implemented in computer software, computer hardware, or any combination of computer hardware and software. For example, print agent 122 may be implemented as one or more software processes executing on client device 102. As another example, print agent 122 may be implemented as executable code installed on client device 102. According to one embodiment of the invention, print agent 122 is implemented on client device 102 as a separate process from application programs 112, 114.

Storage 124 may be implemented by any type of storage. Examples of storage 124 include, without limitation, volatile memory, such as random access memory (RAM) and non-volatile storage, such as one or more disks or flash memory. In FIG. 1, storage 124 is depicted as storing print data 126, error log data 128 and log configuration data 130 for purposes of explanation only, but storage 124 may include various other types of data.

III. Managing Print Errors Using a Print Agent

Figure 2:
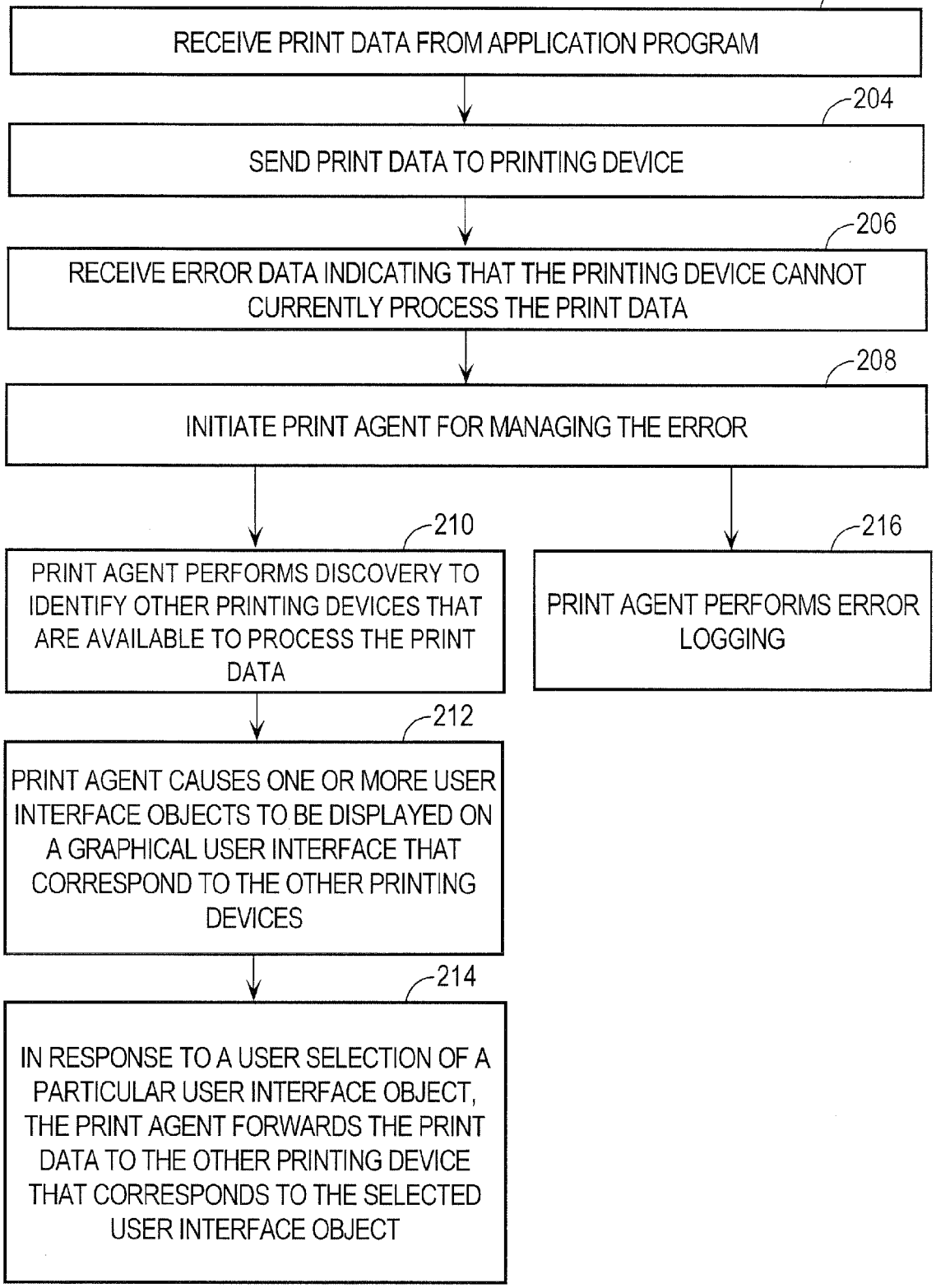
FIG. 2 is a flow diagram that depicts an approach for managing print errors using a print agent according to an embodiment of the invention.

FIG. 2 is a flow diagram 200 that depicts an approach for managing print errors using a print agent according to an embodiment of the invention. In step 202, print data is received from an application program. This may include several steps. For example, suppose that application program 112 is a word processing program. A user uses the word processing program to create a word processing document. The user selects a print option within the word processing program and also a particular printer to print the word processing document. In this example, the user selects printing device 104 and print driver 118 corresponds to printing device 104. The spooler process 116 initiates UI module 300 that generates a graphical user interface to allow the user to select print options and settings. The user selects a set of desired options and settings and closes the graphical user interface. The spooler process 116 returns the options and settings values to the word processing program. The word processing program initiates the rendering module 302 that creates print data that conforms to a format supported by printing device 104. The print driver 216 then provides the print data to the spooler process 116, which stores the print data in a queue, e.g., on storage 124, and the spooler process 116 returns a handle to the application program 112.

In step 204, the print data is sent to the printing device. For example, the spooler process 116 on the client device 102 sends the print data to printing device 204. In step 206, an error occurs and error data is received indicating that the printing device cannot currently process the print data. The error data may indicate, for example, that the printing device is not currently available, or that the printing device does not have a current level of consumables that is sufficient to process the print data. The error data may be received by the spooler process 116.

In step 208, a print agent is initiated for managing the print error. For example, the spooler process 116 that received the error data in step 206 initiates the print agent 122 in step 208. This may be done, for example, by the spooler process 116 initiating the asynch UI module 306 via the port monitor 304. The asynch UI module 306 in turn initiates the print agent 122. Since the asynch UI module 306 may be implemented as a dynamically linked library (DLL), the asynch UI module 306 may be updated to call the print agent 122 without requiring any changes to print drivers 118, 120 or application programs 112, 114.

Figure 4:
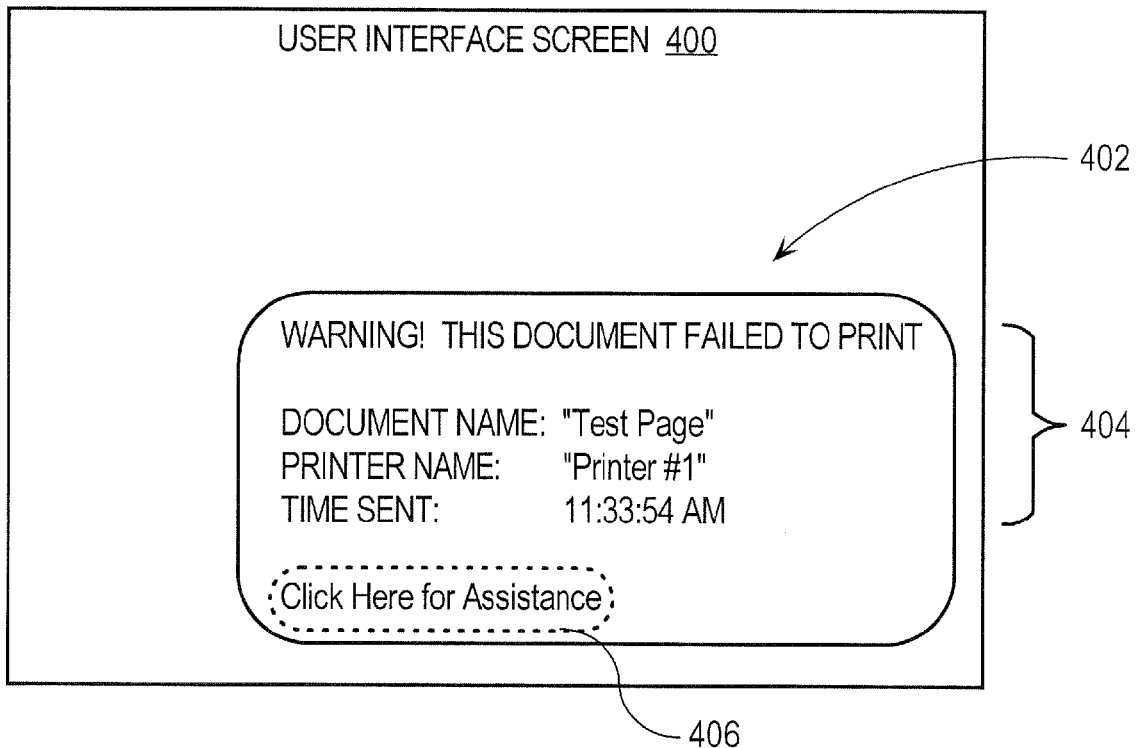
FIG. 4 is a block diagram that depicts an example user interface screen generated by print agent.
Figure 5:
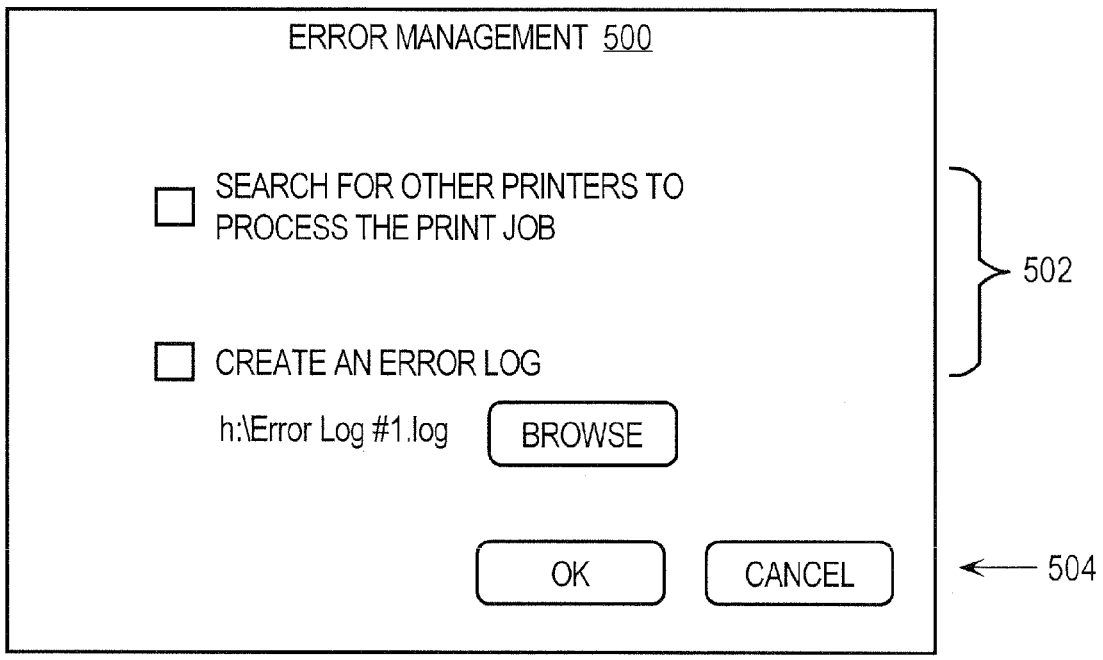
FIG. 5 is a block diagram of an example user interface screen for providing access to the error management functionality provided by print agent, according to one embodiment of the invention.

The print agent 122 is separate from the application program 112 that generated the print data and provides functionality for managing the print error. According to one embodiment of the invention, print agent 122 generates and displays a graphical user interface that gives a user an option of selecting a discovery service or an error logging service. FIG. 4 is a block diagram that depicts an example user interface screen 400 generated by print agent 122. User interface screen 400 includes a warning message dialog 402 that visually depicts to a user information 404 that indicates that the print data was not successfully processed and that an error occurred. The warning message dialog 402 includes a message and corresponding link 406 to obtain additional assistance. Selecting the message and corresponding link 406 causes a graphical user interface to be displayed that provides access to error management functionality provided by print agent 122. FIG. 5 is a block diagram of an example user interface screen 500 for providing access to the error management functionality provided by print agent 122, according to one embodiment of the invention. User interface screen 500 includes checkboxes for selecting the discovery service or the error logging service, as well as confirmation and cancel controls 504.

In response to detecting a user selection of the discovery service functionality, in step 210, the print agent 122 performs discovery to identify other printing devices that are available to process the print data 126. This may include, for example, the print agent 122 generating and transmitting one or more broadcast messages over network 108. Available printing devices respond to the broadcast messages to identify themselves. The print agent 122 then queries those printing devices for additional information. For example, the print agent 122 may generate and transmit one or more SNMP requests to obtain information about the installed options and features of each printing device. The approach used by the print agent 122 to perform discovery may be determined by code or other data within print agent 122. Alternatively, discovery parameters may be configured by administrative personnel or specified by configuration data that is accessible by the print agent 122.

Figure 6:
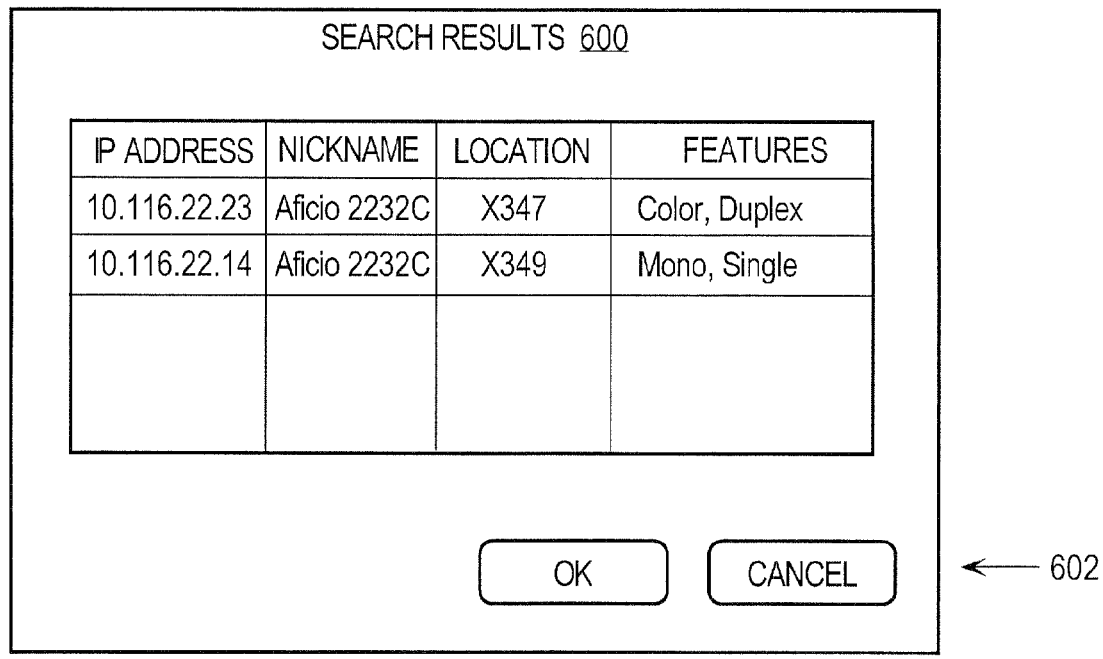
FIG. 6 is a block diagram that depicts an example search results screen that includes user interface objects that depict attributes of two available printers.

In step 212, the print agent 122 causes one or more user interface objects to be displayed on a graphical user interface. The user interface objects correspond to the one or more other printing devices that are available to process the print data 126. For example, FIG. 6 is a block diagram that depicts an example search results screen 600 that includes user interface objects that depict attributes of two available printers. A user may select one of the printing devices indicated on search results screen 600 and user interface controls 602 allow a user to confirm or cancel a selected printing device.

In step 214, in response to a user selection of a particular user interface object, the print agent 122 forwards the print data 126 to the printing device that corresponds to the particular user interface object. The print data 126 is processed by the selected printing device. The print agent 122 may also be configured to display a confirmation message that the print data 122 was successfully forwarded to the selected printing device.

Returning to step 208, in response to detecting a user selection of the error logging functionality, in step 216, the print agent 122 performs error logging. Error logging generally involves generating error log data 128 that indicates attributes of errors and/or conditions that prevented the processing of print data 126 at a printing device. Error log data 128 may include data in a wide variety of data formats, depending upon a particular implementation, and the approach is not limited to any particular data form. For example, error log data 128 may be in a machine-readable format for processing by an application program. Alternatively, error log data 128 may be in human-readable form so that it can be read directly by administrative personnel. For example, error log data 128 may be an ASCII file. As depicted in FIG. 5, a user may also specify a name and location for the log file.

According to one embodiment of the invention, the contents and format of error log data 128 is defined by log configuration data 130. Log configuration data 130 may be in a wide variety of formats, depending upon the requirements of a particular implementation. According to one embodiment of the invention, log configuration data 130 is an XML file that defines the format and content of error log data 128. For example, log configuration data 130 may specify steps to be taken to create error log data 128, as well as the content of error log data 128 and the location of error log data 128. This may include what requests to make to a printing device to gather additional information about an error. For example, log configuration data 130 may specify one or more queries that are to be made to a printing device to gather additional information about the condition of the printing device. Log configuration data 130 may be specific to a particular printing device, or may be used with multiple printing devices. For example, log configuration data 130 may contain configuration data for multiple printing devices.

Although the steps of FIG. 2 are depicted as occurring in a particular order, the approach is not limited to this particular order. Furthermore, fewer or more steps may be used, depending upon the requirements of a particular implementation.

IV. Implementation Mechanisms

Figure 7:
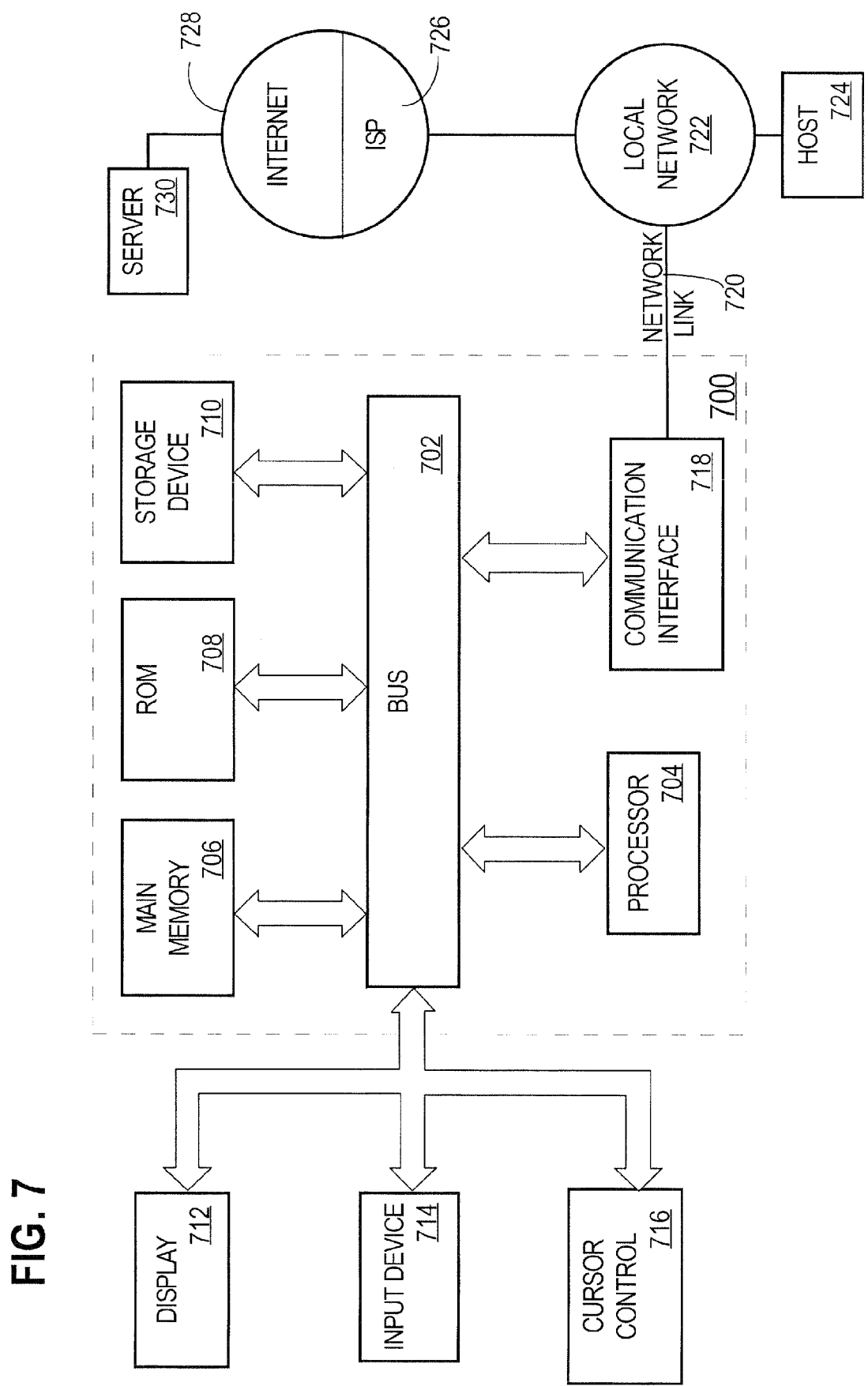
FIG. 7 is a block diagram of a computer system on which embodiments of the invention may be implemented.

The approach described herein for managing print errors using a print agent may be implemented on any computing architecture or platform, depending upon the requirements of a particular implementation. For purposes of explanation, FIG. 7 is a block diagram that depicts an example computer system 700 upon which embodiments of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 700, various computer-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for processing print data, the computer-implemented method comprising:
at a client computing device,
   receiving print data from an application program, the print data conforming to a format supported by a printing device;
   a spooler process sending the print data to the printing device;
   the spooler process receiving error data that indicates that the printing device is not able to currently process the print data; and
   in response to receiving the error data, the spooler process initiating a print agent that is separate from both the application program and the spooler process and the print agent:
      automatically discovers one or more other printing devices that are currently available to process the print data,
      causes a graphical user interface to be displayed, wherein the graphical user interface includes one or more graphical user interface objects that correspond to the one or more other printing devices, and
      in response to detecting a user selection of a particular user interface object that corresponds to a particular printing device, sending the print data to the particular printing device for processing; wherein the print agent is separate from one or more print drivers that reside on the client device.

2. The computer-implemented method as recited in claim 1, wherein the error data indicates that the printing device is not able to currently process the print data because of one or more of: the printing device is not currently available, the printing device has a current error condition and the printing device has an insufficient amount of available consumables.

3. The computer-implemented method as recited in claim 1, wherein initiating the print agent is performed by a spooler process initiating the print agent via an asynch UI module.

4. The computer-implemented method as recited in claim 1, further comprising the print agent querying the one or more other printing devices to determine one or more installed options and features of each of the one or more other printing devices.

5. A non-transitory computer-readable medium for processing print data, the computer-readable medium carrying instructions which, when processed by one or more processors, causes:
at a client computing device,
   receiving print data from an application program, the print data conforming to a format supported by a printing device;
   a spooler process sending the print data to the printing device; the spooler process receiving error data that indicates that the printing device is not able to currently process the print data; and
   in response to receiving the error data, the spooler process initiating a print agent that is separate from both the application program and the spooler process and the print agent:
      automatically discovers one or more other printing devices that are currently available to process the print data,
      causes a graphical user interface to be displayed, wherein the graphical user interface includes one or more graphical user interface objects that correspond to the one or more other printing devices, and
      in response to detecting a user selection of a particular user interface object that corresponds to a particular printing device, sending the print data to the particular printing device for processing; wherein the print agent is separate from one or more print drivers on the client device.

6. The non-transitory computer-readable medium as recited in claim 5, wherein the error data indicates that the printing device is not able to currently process the print data because of one or more of: the printing device is not currently available, the printing device has a current error condition and the printing device has an insufficient amount of available consumables.

7. The non-transitory computer-readable medium as recited in claim 5, wherein initiating the print agent is performed by a spooler process initiating the print agent via an asynch UI module.

8. The non-transitory computer-readable medium as recited in claim 5, further comprising one or more additional instructions which, when processed by the one or more processors, causes the print agent to query the one or more other printing devices to determine one or more installed options and features of each of the one or more other printing devices.

9. A client device for processing print data, the client device comprising a memory for storing instructions which, when processed by one or more processors, causes:
   receiving print data from an application program, the print data conforming to a format supported by a printing device;

a spooler process sending the print data to the printing device;

the spooler process receiving error data that indicates that the printing device is not able to currently process the print data; and in response to receiving the error data, the spooler process initiating a print agent that is separate from both the application program and the spooler process and that:

automatically discovers one or more other printing devices that are currently available to process the print data, causes a graphical user interface to be displayed, wherein the graphical user interface includes one or more graphical user interface objects that correspond to the one or more other printing devices, and in response to detecting a user selection of a particular user interface object that corresponds to a particular printing device, sending the print data to the particular printing device for processing; wherein the print agent is separate from one or more print drivers that reside on the client device.

10. The client device apparatus as recited in claim 9, wherein the error data indicates that the printing device is not able to currently process the print data because of one or more of: the printing device is not currently available, the printing device has a current error condition and the printing device has an insufficient amount of available consumables.

11. The client device as recited in claim 9, wherein initiating the print agent is performed by a spooler process initiating the print agent via an asynch UI module.

12. The client device as recited in claim 9, wherein the memory further stores one or more additional instructions which, when processed by the one or more processors, causes the print agent to query the one or more other printing devices to determine one or more installed options and features of each of the one or more other printing devices.

\* \* \* \* \*